J. C. WRIGHT, Jr.
COUPLING.
APPLICATION FILED JUNE 14, 1913.
1,121,546.
Patented Dec. 15, 1914.
4 SHEETS—SHEET 3.
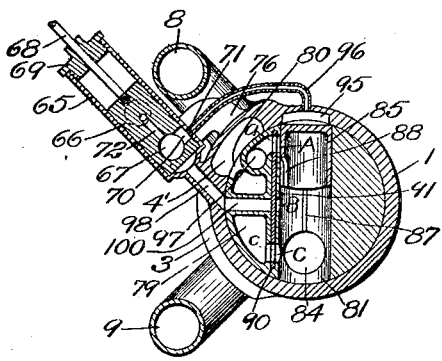
Fig. X.
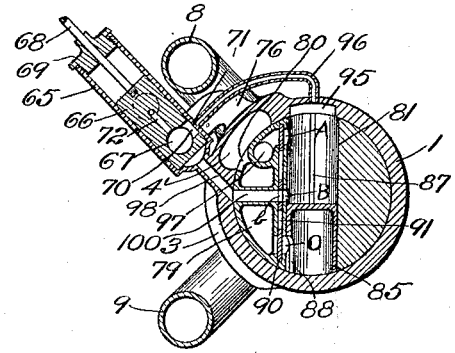
Fig. XI.
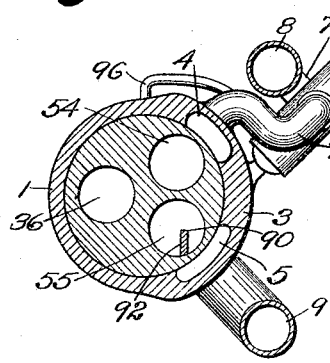
Fig. XII.
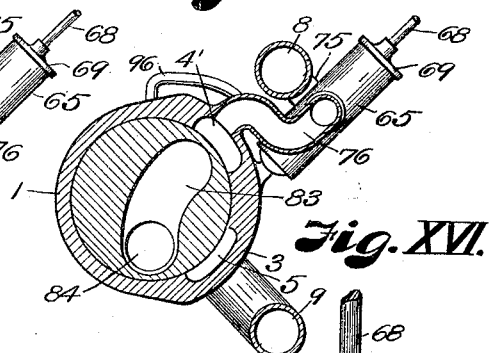
Fig. XIII.
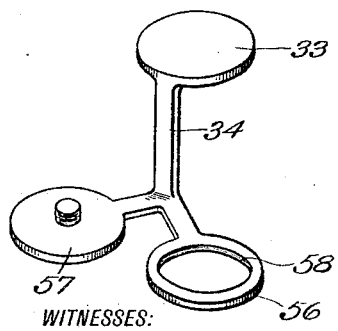
Fig. XIV.
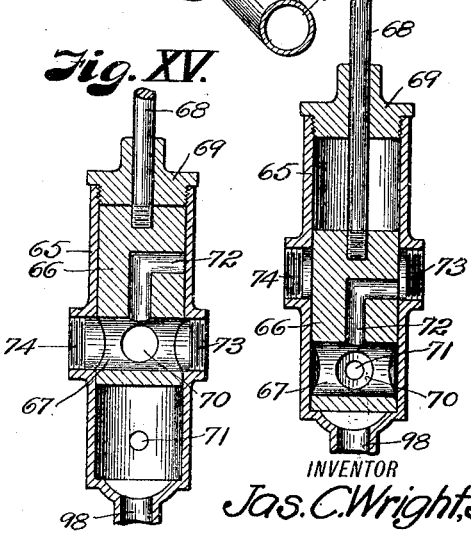
Fig. XV.
Fig. XVI.
WITNESSES:
Arthur W. Caps.
L. E. Coats.
INVENTOR
Jas. C. Wright, Jr.
BY
Arthur C. Brown
ATTORNEY J. C. WRIGHT, Jr.
COUPLING.
APPLICATION FILED JUNE 14, 1913.
1,121,546.
Patented Dec. 15, 1914.
4 SHEETS—SHEET 4.
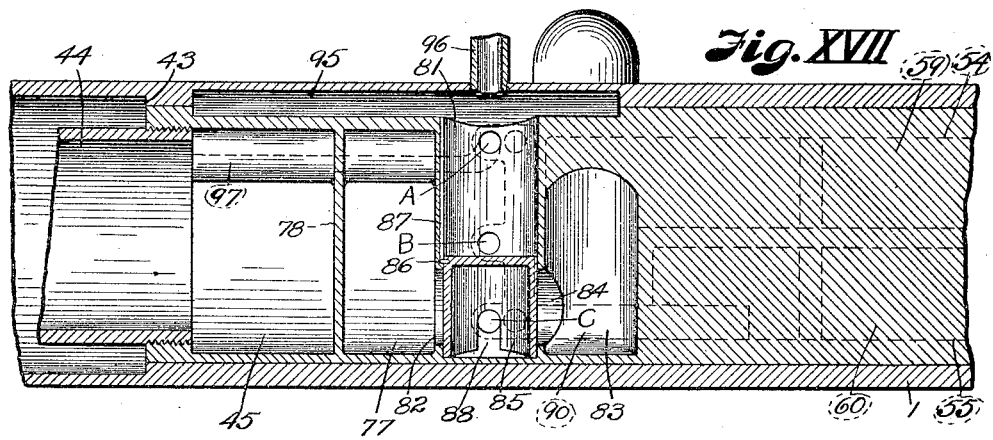
Fig. XVII
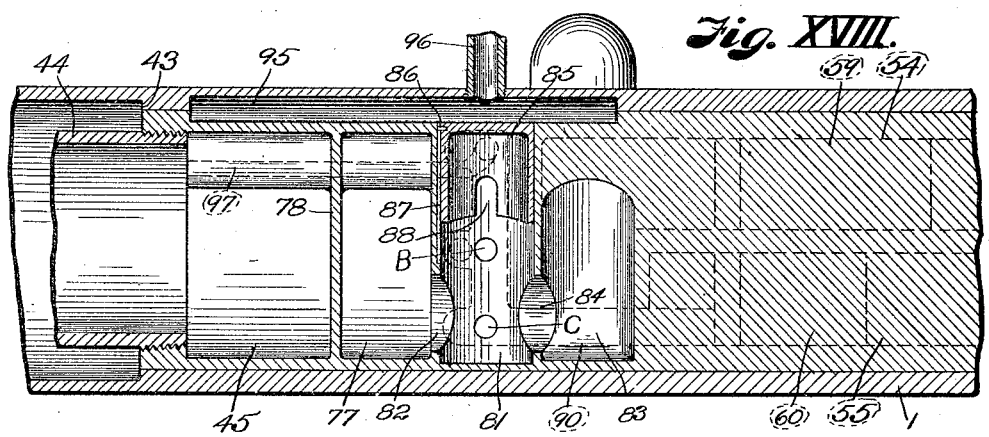
Fig. XVIII.
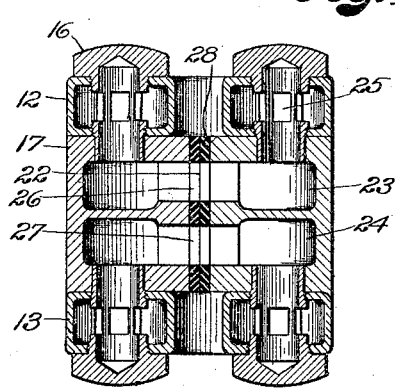
Fig. XIX.
WITNESSES:
Arthur W. Caps.
L. E. Coats.
INVENTOR
Jas. C. Wright, Jr.
BY
Arthur C. Brown
ATTORNEY

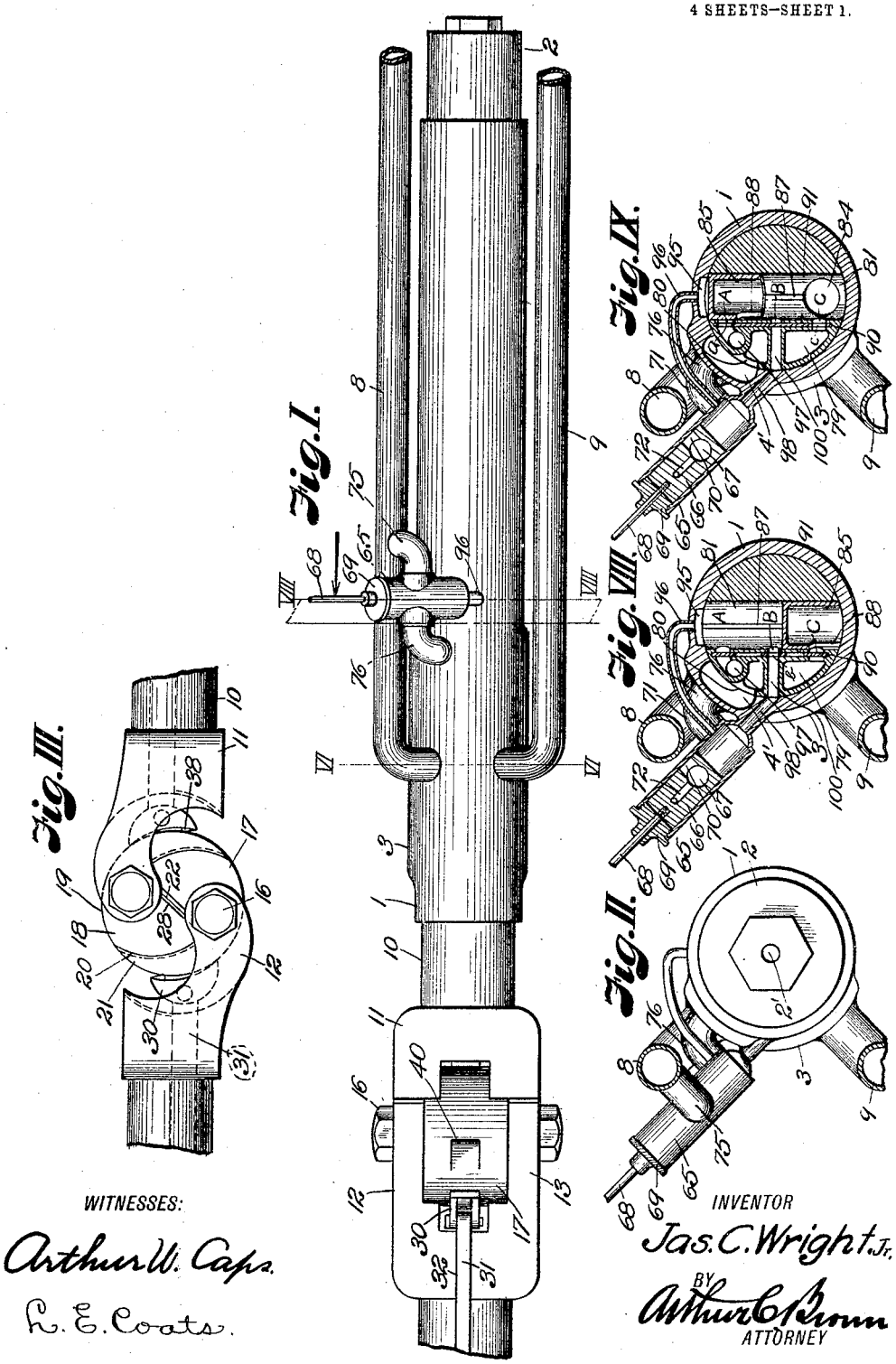

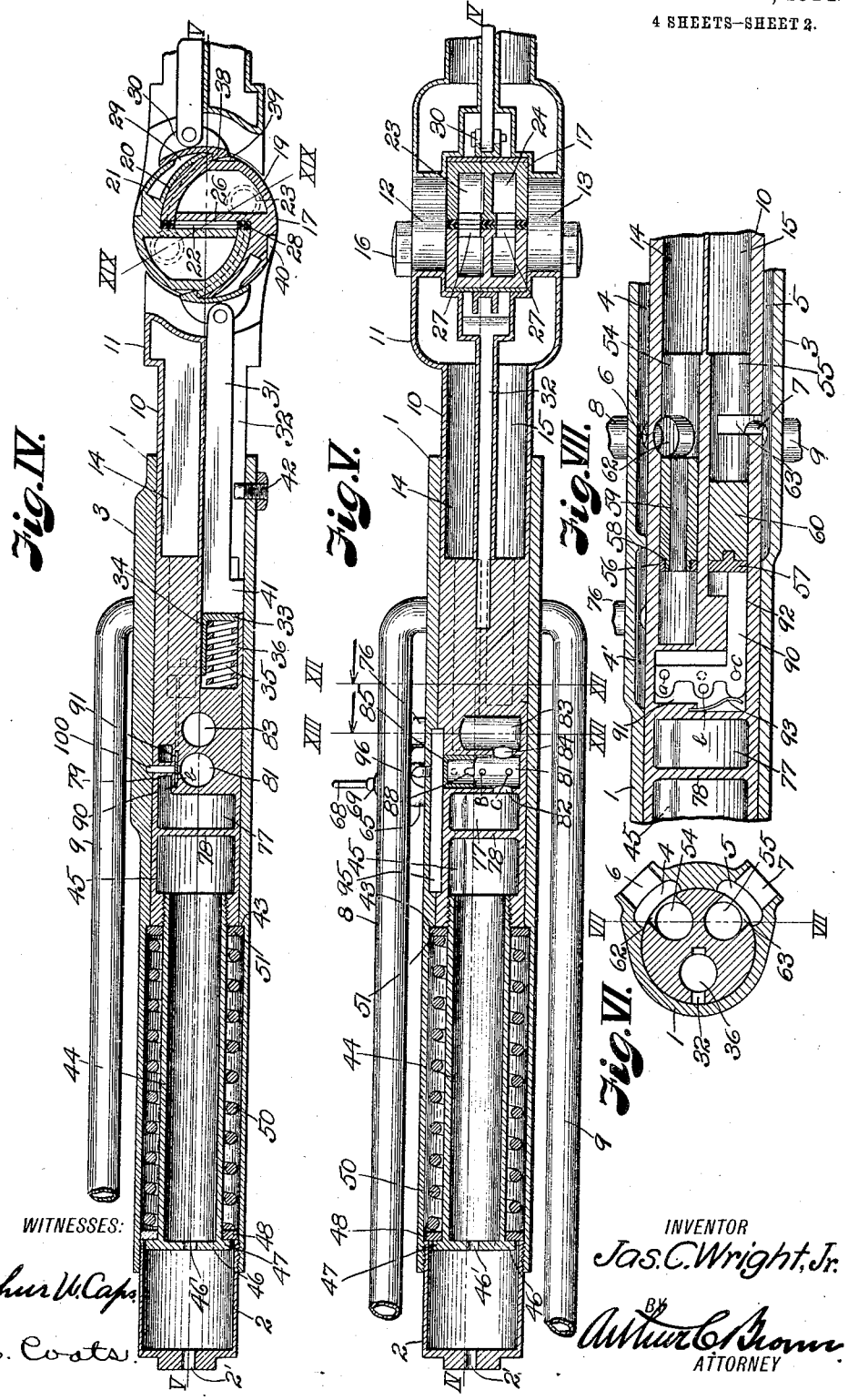

UNITED STATES PATENT OFFICE.

JAMES C. WRIGHT, JR., OF RIVERSIDE, CALIFORNIA.

COUPLING.

1,121,546. Specification of Letters Patent. Patented Dec. 15, 1914.

Application filed June 14, 1913. Serial No. 773,754.

*To all whom it may concern:*

Be it known that I, JAMES C. WRIGHT, Jr., a citizen of the United States, residing at Riverside, in the county of Riverside and State of California, have invented certain new and useful Improvements in Couplers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in automatic air couplings for railway cars, and has for its principal object to provide an apparatus for automatically connecting or disconnecting the air equipment of one railway car with that of another car, or with a locomotive, simultaneously with the coupling or uncoupling of the cars, and whereby a signal is transmitted to the engineer or conductor and all brakes set when such equipment is uncoupled.

It is a further object of my invention to provide an air coupling with means for retaining the air in the equipment, so that in cutting a train for a crossing, or setting out a car, the brakes will not be set either in the main or detached sections, but a signal will be energized to notify the trainmen that such parts have been successfully disconnected.

In accomplishing these and other objects of the invention, I have provided the improved details of structure hereinafter described and illustrated in the accompanying drawings, wherein:—Figure I is a side elevation of an automatic air coupling constructed in accordance with my invention. Fig. II is an end view of the same. Fig. III is a plan view of the coupling head, showing the parts at the moment of contact. Fig. IV is a longitudinal, horizontal section taken on the line IV—IV, Fig. V. Fig. V is a longitudinal vertical section on the line V—V, Fig. IV. Fig. VI is a transverse section on the line VI—VI, Fig. I. Fig. VII is a longitudinal section of a portion of the valve chamber taken on the line VII—VII, Fig. VI. Figs. VIII, IX, X and XI are transverse sectional views on the line VIII—VIII, Fig. I, showing the relation of the parts at different points of operation. Fig. XII is a transverse sectional view on the line XII—XII, Fig. V. Fig. XIII is a transverse sectional view on the line XIII—XIII, Fig. V. Fig. XIV is a perspective view of the valve actuating device. Fig. XV is a longitudinal sectional view of the hand valve, taken at right angles to that shown in normal position. Fig. XVI is a similar view showing the parts in position to retain the air in the brake and signal lines. Fig. XVII is an enlarged central, longitudinal section through a portion of the valve chamber, the parts being in position to retain the air in each individual section of the equipment. Fig. XVIII is a similar view showing the parts in position to provide a free passage of air through the by-pass and through the brake line of each individual section of the equipment. Fig. XIX is an enlarged vertical section on the line XIX—XIX, Fig. IV.

Referring more in detail to the parts: 1 designates the barrel of an automatic air coupling, one of which is secured to each end of a railway car (not shown) in any suitable manner, and comprises a tubular shell, having a cap 2 provided with a central aperture 2' threaded into one end and an elongated boss 3 near the opposite end for inclosing the longitudinal chambers 4, 4' and 5' the latter being provided with ports 6 and 7 that communicate with the pipes 8 and 9 of the main brake and signal lines respectively.

Slidably mounted within the barrel 1 is a coupling pipe 10 which extends beyond the end thereof and is provided with a coupling head 11 comprising upper and lower hollow arms 12 and 13, which communicate with the passages 14 and 15 in the coupling pipe 10 and are provided with hollow studs 16 upon which the coupler jaw 17 is pivotally mounted. The jaw 17 is substantially E shaped in appearance and comprises a body portion 18 having a semicircular rear face 19, a curved outer face 20, and a semi-crescent shaped tooth 21 projecting from the flat face 22, the curved outer face of the jaw lying in the plane of the semi-circular face 19 and the inner face being of the same radius as the face 20. The interior of the jaw is divided into upper and lower chambers 23 and 24 which communicate with the passages 14 and 15, through the hollow studs 16, the latter being provided with apertures 25 to permit the free circulation of air therethrough.

The chambers 23 and 24 are provided with ports 26 and 27 which open through the flat face 22, and are surrounded by suitable packing 28, the latter chamber being extended through the semi-crescent shaped tooth 21 and provided with an opening 29 which is adapted to lie beneath a shoe 30 when the coupling heads of different cars are in locked position, (Fig. IV.) Shoe 30 is pivotally mounted at one end of a bar 31, which is slidably mounted in a groove 32, in the coupling pipe 10, the opposite end of the bar being adapted to rest against the head 33 of a valve actuating device 34, which is tensioned by a spring 35 that rests in a pocket 36, so that the shoe 30 is held yieldingly outward against the face 19 of the coupler jaw and so that when two coupler heads are brought together the pawl 38 on the outer face of shoe 30 will hold in the notch 39 of one coupler jaw and simultaneously close the port 29 of the adjacent jaw. Each jaw is provided with a second notch 40 adapted for engagement by the tooth 38 when the parts are open to hold the parts in readiness for a coupling to be made. The bar 31 is provided with a downturned shoulder 41 which is adapted to engage the stud 42 in the barrel 1, for the purpose presently described.

The inner end of the coupling pipe 10 terminates adjacent a shoulder 43 on the inner face of the barrel 1, and is provided with a tubular extension 44 which is threaded into the chamber 45 of the pipe and provided with an end 46, having a central aperture 46' and shoulder 47, against which, and the cap 2, rests a ring 48.

Surrounding the tubular extension 44 is a coil spring 50 which bears against the ring 48 and against a similar ring 51 that rests against the shoulder 43 and the end of the coupling pipe 10, so that when a coupling is made, the coupling pipe will yieldingly recede within the barrel far enough to compensate for the variation in different cars, the tension being taken up by the spring 50 and washer 48 that bears against the cap 2 and the washer 51 that bears against the end of the coupling pipe. It will be seen that when the cars are disconnected the action of the spring 50 is the same but the washer 48 then bears against the shoulder 47 on the extension 44 and the washer 51 against the shoulder 43 on the barrel 1.

In an automatic air coupling of this type, it is necessary, in addition to joining the heads together, to provide means for maintaining a circulation of air through the brake line should the cars accidentally part, and also to provide means for manually retaining the air in each car or section of a train, so that the brakes will not be set, should it be desired to set out a car or when a train is being switched. In order to avoid confusion I will describe the two functions in this sequence. At the rear end of the passages 14 and 15 are valve chambers 54 and 55 in which are slidably mounted the heads 56 and 57 of the valve actuating device 34, the one being provided with a threaded aperture 58, into which is threaded the tubular valve 59, the other having a solid valve head 60 somewhat shorter than the valve 59. When two cars part the coupling pipes 10 are drawn from the barrel 1 against the tension of the spring 50 until the shoulder 41 of the bar 31 strikes the stud 42 to disengage the pawl 38 from the notch 39 and release the jaws 17 which swing on their pivotal mounting and permit the bar 31 and the valve actuating device 34 to move outwardly under the influence of spring 35, thereby moving the tubular valve 59 over the port 62 in the valve chamber 54 and the valve 60 over the slotted port 63 in the channel 55, the latter, which controls the signal line, being adapted to close later than the other, so that a signal in the engine or caboose will be energized to notify the engineer or conductor that the train has parted, such signals, as they form no part of the present invention not being shown.

In order to automatically set the brake simultaneously with the parting of the cars, it is necessary to by-pass the air in order that it will exhaust through the coupling heads, as the valve 59 has closed the port 62 in the brake line. The by-pass I prefer to use comprises, in detail, a cylinder (Fig. XV) 65 containing a plunger 66 having a transverse bore 67 and a rod 68 which extends upwardly through a screw cap 69. The bore 67 has a lateral opening 70 which registers with an opening 71 in the cylinder, and an upwardly extending bore 72 that turns radially at right angles and opens through the side of the plunger. On each side of the cylinder, and in line with the bore 67, are openings 73 and 74, the former being connected by means of an elbow 75 to the main brake line 8, and the latter having double elbow connection 76 with the chamber 4'.

Immediately in front of chamber 45 is another chamber 77 which is separated therefrom by a partition 78, and which has an extended portion 79 that connects with the chamber 4 through an opening 80. Adjacent the chamber 79 is a vertical cylinder 81 having three laterally opening, circular ports A, B and C, which communicate with a duct 97, a passage 100, and the chamber 79 respectively, and which may be opened and closed by means of a slide valve 90, presently described. The vertical cylinder 81 communicates with the chamber 79 through port C, with the chamber 77 through an opening 82 and with a duct 83 through the opening 84, which latter extends upwardly and forwardly (Figs. XIII—XVII) and communicates with the passage 14 through the tubular valve 59.

Slidably mounted in the cylinder 81 is a piston 85 having pin and groove connection 86 and 87 with the cylinder wall and a notch 88 in its lower edge, and which is adapted for actuation by gravity and by air pressure admitted or exhausted through the ports A, B and C, to open or close the openings 82 and 84. The air pressure through the ports A, B and C is governed by a slide valve mechanism comprising a flat right angular member 90, the vertical leg of which is slidably mounted in a slot 91 between the chamber 79 and the cylinder 81, and is provided with apertures $a$, $b$ and $c$ arranged so that the apertures $a$ and $c$ will register with ports A and C and the port $b$ will be closed, or vice versa. The horizontal leg of the slide valve extends forwardly through an aperture 92 into the channel 55 and is held yieldingly in its forward position by a spring 93. The slide valve 90 is adapted for actuation by the last quarter inch of the stroke of the valve actuating device 34, i. e., when a coupling is made, and the bar 31 is forced backwardly, the device 34 is moved to open the ports 62 and 63 and during the last quarter inch of its travel the slide valve 90 is actuated, as is clearly shown in dotted lines, Figs. XVII—XVIII.

The upper end of the cylinder 81 opens into a chamber 95 formed partly in the barrel 1 and partly in coupling pipe 10, and is provided with a tube 96 that connects with the aperture 71 in the cylinder 65.

The port A communicates with a duct 97 which extends rearwardly through the chambers 77 and 45, exhausts into the tubular extension 44, and into the atmosphere through apertures 46′ and 2′.

The lower portion of cylinder 65 is provided with a duct 98 (Fig. XV) which communicates with the port B through a passage 100, so that air from the cylinder 81 will flow through the port B, passage 100 and duct 98 directly on the bottom of the piston 66 and raise it to its normal position.

In the operation of the apparatus, presuming a train standing on a siding with no air in the brake or signal lines, and all brakes set, the coupler jaws 17 at each end of the train are open, the valves 59 and 60 cover the ports 62 and 63 respectively, the piston 85 is at the bottom of the cylinder 81 closing the openings 82 and 84, the ports A and C are closed, the port B open and the plunger 66 is at the top of cylinder 65 (Figs. VIII—XVII.) A locomotive equipped with a similar coupling head backs up to the train and the brake and signal lines are automatically connected through the jaw ports 26 and 27 and through the ports 62 and 63 which have been uncovered by the movement of the valves 59 and 60, and the ports A and C opened and port B closed by movement of the slide valve 90. The locomotive air pump is now set in operation and the brake and signal lines filled with air, which rushes through the port C and lifts the piston 85 to the top of the cylinder 81 (Fig. IX,) the air above the cylinder being exhausted through the port A into the duct 97. This action uncovers the openings 82 and 84 so that air from the main brake line 8, which has passed through the by-pass and filled the chambers 4′ and 77—79, will flow through the openings 82 and 84, into duct 83, through the tubular valve 59 and commingle with the air in the passage 14, thereby releasing the brakes and placing all parts under neutral pressure. After the train is in motion, should any part of the train become disconnected or broken from the other, the action will be as follows: The coupling pipes 10 at that particular point will be moved in their respective barrels until the shoulder 41 of bar 31 engages the stud 42 so that the shoe 30 is removed from the opening 29 to energize the signal, and the pawl 38 is removed from the notch 39, at which point the coupling jaws 17 part and the valves 59 and 60 instantly close the ports 62 and 63 to close the air line, but the by-pass is open so that air will flow through this channel and through the tubular valve 59 until the pressure is exhausted and the brakes are set. The piston 85 will then fall by gravity and close the openings 82 and 84, and the locomotive may pump up the air line on the section that has remained intact and back up and couple onto the other section, as heretofore described. If it is desired to cut a train for a crossing, set out a car or remove one or more cars, as in the general practice of switching, the rod 68, which is suitably connected so as to be accessible from each side of the car, is moved downwardly by the trainman, thereby moving the piston 66 downwardly and the transverse bore 67 away from the openings 73 and 74 and establishing connection between the opening 73 and the tube 96. The air will now flow (Fig. I) from the main brake line 8, through elbow 75 (Fig. XVI), bore 72, bore 67, opening 71, (Fig. X), tube 96 and chamber 95, thus exerting a pressure on top of the piston 85 equal to the pressure on the bottom thereof. The coupling pin is then removed and the disconnection made. The valves 59 and 60 instantly close the ports 62 and 63 and the small volume of air contained in the chambers 4′, 77 and 81 is instantly relieved through the duct 83 and tubular valve 59 so that the pressure on the top of the piston 85 moves it quickly downward to close the openings 82 and 84. Simultaneously with the closing of the valves 59 and 60 the slide valve 90 was moved forward by the spring 93 so as to close ports A and C and open port B (Fig. XI.) The volume of air which is now flowing into the cylinder 81 through the tube 96, and which lowered the piston 85, passes through the port B into passage 100 and duct 98. Here it encounters the plunger 66 and exerts a pressure on the bottom of the plunger causing it to rise quickly to the top of the cylinder (Fig. XV.) The parts are thus automatically brought back to their normal positions and the air retained in the brake and signal lines, so that the brakes will not be set and the cars may be moved about as desired.

Having thus described my invention, what I claim as new therein, and desire to secure by Letters-Patent, is:—

1. In an air coupling, a barrel having an air conduit, a coupling pipe having an air channel, valved connection between said conduit and channel, and means for by-passing the main current of air around said valved connection.

2. In an air coupling, a barrel having air conduits, a coupling pipe having air channels, valved connections between said conduits and channels, and means for by-passing air around one of said valved connections.

3. In an air coupling, a barrel having elongated air chambers, a coupling pipe slidably mounted in said barrel, having air channel ports adapted for communication with said air chambers, and a spring in said barrel for holding said chambers and ports in communication.

4. In an air coupling, a barrel having air conduits, a coupling pipe slidably mounted in said barrel and having air channels, valved connection between said conduits and channels, and means for commingling the air in one of said conduits with the air in one of said channels when said valves are closed.

5. In an air coupling, a barrel having an air conduit, a coupling pipe having an air channel and channel port, a tubular valve adapted for closing said port, and means for conducting air around said port and through said tubular valve.

6. In an air coupling, a barrel having an air conduit, a coupling pipe having an air channel and channel port adapted for communication with said air conduit, a tubular valve for closing said port, and means for conducting air around said port and through said tubular valve.

7. In an air coupling, a barrel having an air conduit, a coupling pipe slidably mounted in said barrel and having an air channel and channel port, a tubular valve for closing said port, a piston valve adjacent said tubular valve, a slide valve for actuating said piston valve, and a by-pass for conducting air through said piston valve and through said tubular valve.

8. In an air coupling, a barrel having an air conduit, a coupling pipe slidably mounted in said barrel and having an air channel and channel port communicating with said air conduit, a tubular valve for closing said port, a by-pass connecting said conduit and said tubular valve, a piston valve for opening and closing said by-pass, and a slide valve for governing said piston valve.

9. In an air coupling, a barrel having an air conduit, a coupling pipe slidably mounted in said barrel and having an air channel and channel port, a coupling jaw pivotally mounted in said coupling pipe, a bar slidably mounted in said coupling pipe and operable from said jaw, a tubular valve for closing said channel port, a by-pass connecting said conduit and channel, a piston valve for opening said by-pass, and a slide valve operable from said sliding bar for governing said piston valve.

10. In an air coupling, a barrel having an air conduit, a coupling pipe having an air channel and channel port communicating with said air conduit, a tubular valve for closing said port, a by-pass connecting said conduit and said channel, a piston valve in said by-pass, and a slide valve operable from said tubular valve mechanism whereby air is admitted beneath said piston and exhausted above said piston to open said by-pass and admit air from said conduit through said tubular valve to said channel.

11. In an air coupling, a barrel having an air conduit, an apertured cap in one end of said barrel, a coupling pipe slidably mounted in said barrel, having an air channel and channel port communicating with said air conduit, and having an apertured tubular extension slidably mounted in said apertured cap, a tubular valve for closing said port, a by-pass member connecting said conduit and said channel, a piston valve in said by-pass member, and a slide valve operable from said tubular valve mechanism, whereby air is admitted beneath said piston and exhausted above said piston, into and through said apertured tubular extension and apertured cap to open said by-pass and admit air from said conduit through said tubular valve to said channel.

12. In an air coupling, a barrel having an air conduit, a coupling pipe having an air channel and channel port, communicating with said air conduit, a tubular valve for closing said port, a by-pass connecting said conduit and channel, a piston valve in said by-pass, a slide valve having a plurality of ports communicating with said piston valve, a hand valve in said by-pass, and a tube leading from said hand valve to said piston valve whereby air is conveyed to lower said piston and close said valve.

13. In an air coupling, a barrel having an air conduit, a coupling pipe having an air channel and channel port, a tubular valve for closing said port, a by-pass for conveying air from said conduit to said channel around said closed channel port, a manually operable valve in said by-pass, and means for closing said manually operable valve for retaining air in said conduit.

14. In an air coupling, a barrel having an air conduit, a coupling pipe having an air channel and channel port, a tubular valve for closing said channel port, a by-pass for conveying air from said conduit to said channel around said closed channel port, a manually operable valve in said by-pass having an air duct whereby air is conducted from said by-pass to open said manually operable valve.

15. In an air coupling, a barrel having an air conduit, a coupling pipe having an air channel and channel port, a tubular valve for closing said channel port, a by-pass for conducting air from said conduit to said channel around said closed channel port, a piston valve in said by-pass, a piston in said piston valve, a slide valve for operating said piston valve, a manually operable valve in said by-pass having an air duct, a piston in said manually operable valve having an internal duct, and a tube leading from said internal duct to said piston valve whereby air from said conduit passes through said internal duct, through said tube, into said piston valve, through said slide valve, through said by-pass and through said manually operable valve duct to raise said manually operable valve piston.

16. In an air coupling, a barrel having a pair of longitudinal chambers, an air conduit communicating with one of said chambers, a coupling pipe slidably mounted in said barrel having an air channel and channel port, a tubular valve for closing said port, a by-pass connecting said air conduit and said air channel comprising a tube, the other one of said barrel chambers, a coupling pipe chamber and a duct from said coupling pipe chamber to said tubular valve, a piston valve between said coupling pipe chamber and said duct having laterally opening ports, a piston in said piston valve adapted for closing said lateral ports, a slide valve for actuating said piston valve having a plurality of ports communicating with said coupling pipe chamber and with said piston valve, one of said ports communicating with an exhaust duct, a manually operable valve in said by-pass having a laterally opening aperture and a longitudinal duct, a piston in said manually operable valve having an internal duct, a tube communicating with said aperture and with said piston valve and means for actuating said slide valve whereby air is conducted from said conduit through said internal duct, through said aperture and through said tube to lower said piston valve piston and close said lateral ports, thence through one of said slide valve ports, through said coupling pipe chamber, through said barrel chamber, through a portion of said by-pass tube and through said longitudinal duct to open said manually operable valve, for the purpose set forth.

In testimony whereof I affix my signature in presence of two witnesses.

JAMES C. WRIGHT, Jr.

Witnesses:
VERA C. SEARES,
HARRY B. WELLS.

Copies of this patent may be obtained for five cents each, by addressing the "Commissioner of Patents, Washington, D. C."